DISC PACK WITH CARD LABEL

Filed March 2, 1967 2 Sheets-Sheet 1

INVENTORS:
Charles W. David
Richard J. Penny
By Smyth, Roston & Pavitt
ATTORNEYS March 10, 1970 C. W. DAVID ET AL 3,500,364

DISC PACK WITH CARD LABEL

Filed March 2, 1967 2 Sheets-Sheet 2

INVENTORS:
Charles W. David
Richard J. Penny
By Smyth, Roston & Pavitt
ATTORNEYS 3,500,364

DISC PACK WITH CARD LABEL

Charles W. David, El Segundo, and Richard J. Penny, Playa Del Rey, Calif., assignors to Disc Pack Corporation, Hawthorne, Calif., a corporation of California Filed Mar. 2, 1967, Ser. No. 620,009
Int. Cl. G11b 5/82
U.S. Cl. 340—174.1 6 Claims

ABSTRACT OF THE DISCLOSURE

This disclosure describes a disc pack which includes a plurality of memory discs and a supporting structure for retaining the discs in spaced, stacked generally coaxial relationship. The supporting structure includes an upwardly facing cover bezel having a recessed upper face visible from above the disc pack. A card label, which is constructed of a nonfraying material is adhered to the recessed upper face of the cover bezel by an adhesive. The card label has a writing surface thereon, which is visible from above the disc pack, and on which identifying markings can be placed. Means, such as slits, in the card label are provided for facilitating removal of the card label from the cover bezel to permit writing on the writing surface after the card label is removed from the disc pack to present contamination of the memory discs.

BACKGROUND OF THE INVENTION

As is well known, a memory disc is an oxide coated plate-like member on which huge quantities of information can be stored. These discs, which are coming into ever-increasing use, are used with data processing machines. It is conventional practice to mount several of these memory discs together in spaced, stacked, coaxial relationship with a suitable supporting structure. Such a stack of memory discs with its supporting structure is commonly known as a disc pack. To facilitate storage and handling, each disc pack is usually containerized in a removable disc pack enclosure.

In actual use of the disc packs, it is often necessary or desirable to mark a disc pack so that a particular disc pack can be quickly associated with particular information. It is preferred to mark the disc pack itself rather than the disc pack enclosure so that the pack can be identified even with the enclosure removed.

The ordinarily simple task of marking is severely complicated, however, because the memory discs and the entire disc pack must be kept surgically clean. Even a few small foreign particles can contaminate a disc and make it useless or ineffective for its intended purpose. Writing directly on the pack or a label secured to the pack is not permissible because the pen, pencil, or other writing implement create particles, some of which do not adhere to the label or to the pack. These particles are free to fall upon the memory discs and contaminate them.

In actual use of disc packs, the information stored thereon is changed from time to time. This necessitates a corresponding change in the identifying markings placed upon the disc pack. It is very important that the identifying markings be changed without erasing of the old identifying markings because erasing causes partial disintegration of the eraser and, the smaller eraser particles would operate to contaminate the memory discs.

When disc packs are being used, they are rotated at relatively high velocity by a data processing unit. It is important that the disc packs be very accurately dynamically balanced. Accordingly, the marking of the disc packs cannot be accomplished in a manner which would unbalance the disc pack.

The dynamically balanced disc packs are rotated very smoothly and evenly by the data processing units and so it is often difficult to tell by visual inspection whether or not a pack is being rotated. In the past, there have been several instances in which disc packs have been damaged during rotation thereof due to being contacted by an operator who did not realize that the pack was being rotated. As disc packs are expensive, it is important to eliminate this type of needless damage thereto.

SUMMARY OF THE INVENTION

The present invention provides for marking of a disc pack without danger of contaminating the memory discs and without danger of unbalancing the pack. With the present invention, the same disc pack can be quickly and easily remarked as when another set of data has been recorded thereon, without danger of contamination. The present invention also provides an inexpensive way of advising those in the vicinity of the disc pack whether or not the pack is being rotated.

The present invention teaches use of a card label having a writing surface thereon for marking the disc pack. The identifying marks are placed on the writing surface when the card label is removed from the disc pack. When the card label is appropriately marked, it is adhered to the disc pack by a low holding force pressure sensitive adhesive which is integral with the card label. In the event that any particles are produced during the marking of the card label, they can be removed prior to adhering the card label to the disc pack. To reduce the number of particles produced during the marking operation, it is preferred to write on the card label with pen and ink. The card label should be constructed of a nonfraying material of a type which will readily absorb all of the ink marks placed thereon.

The present invention also facilitates removal of the card label and thereby teaches multiple usage of the same card label in identifying different disc packs or in identifying the same disc pack as the set of information recorded thereon is changed. This may be accomplished by providing a cut in the card label to define an accessible interior edge portion of the card label, which is engageable by the finger of the user to facilitate removal of the card label from the pack. Preferably, the cut in the card label forms two slits in the card label. The region of the card label along the slits is free of adhesive and this feature allows the user to remove the label by using the slits to get a finger beneath the label. Removal of the card label is further facilitated by use of a low holding force pressure sensitive adhesive. After the label is removed, the old identifying marks are crossed out rather than erased and new identifying marks are written on the label, following which the card label is again adhered to the pack. Alternatively, a new label may be used. This assures that the disc pack will not become contaminated due to erasing of the old identifying marks or in writing of new identifying marks on the card label. This feature of the invention also reduces operating expenses in allowing multiple usage of the same card label.

Although the card label could be adhered to the disc pack enclosure, it is preferred to adhere it to the disc pack itself because in actual use of the disc pack, the disc pack enclosure is removed. It has been found that the most suitable location for the card label is on the cover bezel which is located on the upper end of the disc pack. The cover bezel has a well projecting axially inwardly and terminating in a bottom wall which is surrounded by a peripheral wall. The card label is adhered to the cover bezel within the well so that the well protects the card label from contact that may cause fraying thereof. The disc pack has locking means in the form of an axial column portion projecting axially through the well. In order to provide as large a card label as possible and in order that the card label will not tend to unbalance the disc pack, the card label is preferably annular with the outer and inner peripheries thereof lying closely adjacent the peripheral wall and the axial column, respectively. Thus, neither the inner nor outer peripheries of the card label are exposed sufficiently to allow the finger of the user to easily fit therebeneath for purposes of removal. Accordingly, the formation of the slits in the card label are very important to facilitate removal thereof from the disc pack. The upper wall of the disc pack enclosure above the cover bezel is transparent and this allows the identifying marks to be visible, even when the disc pack enclosure is on the disc pack.

When the card label is in place, rotation of the disc pack is immediately apparent upon visual inspection. This may be accomplished by providing at least two portions of different colors on the upper face of the card label. When the disc pack and the card label are rotating at high speed, these two differently colored portions will not be clearly distinguishable as they are when the disc pack is not rotating. Thus, the operator is quickly advised that the disc pack is rotating and that the disc pack should not be contacted other than by the appropriate parts of the data processing unit.

The invention, both as to its organization and method of operation, together with further features and advantages thereof, may best be understood by reference to the following description taken in connection with the accompanying drawings.

DESCRIPTION OF THE PREFERRED EMBODIMENT

Figure 1:
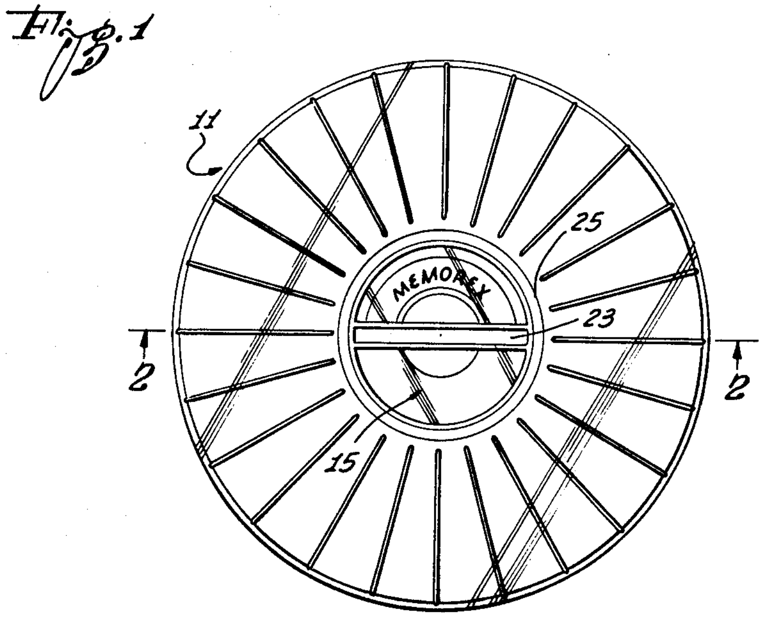
FIG. 1 is a top plan view of a disc pack and disc pack enclosure constructed in accordance with the teachings of the present invention.
Figure 2:
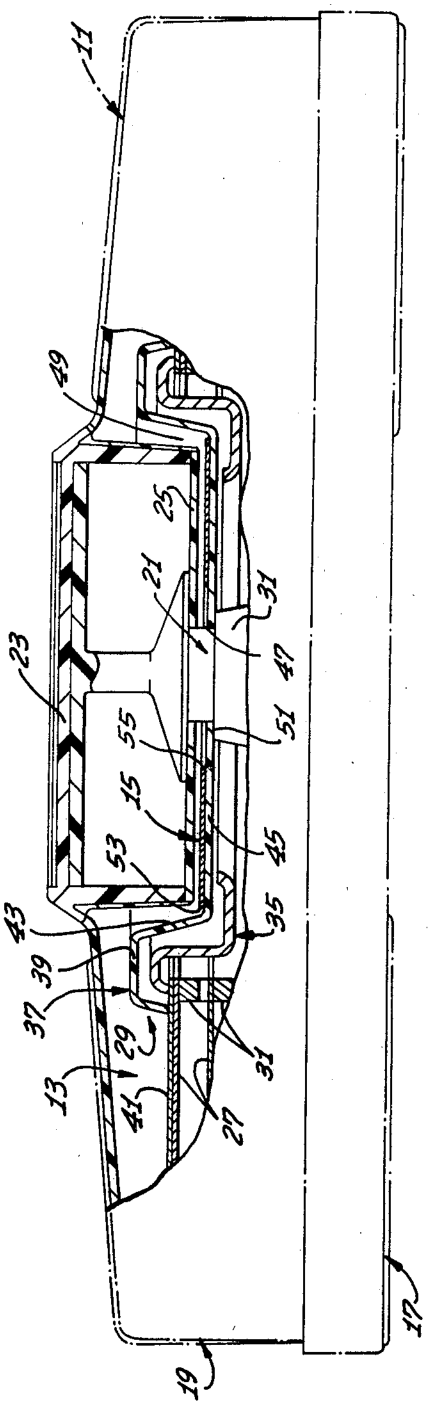
FIG. 2 is an enlarged sectional view taken along line 2—2 of FIG. 1.

Referring to the drawings and in particular to FIGS. 1 and 2 thereof, reference numeral 11 designates a disc pack enclosure. The disc pack enclosure 11 serves as a container for a disc pack 13 (FIG. 2). The disc pack 13 includes a card label 15 adhered thereto.

The details of construction of the disc pack enclosure 11 and the disc pack 13 are fully described in common assignee's copending application Ser. No. 555,476 and are not described in complete detail herein. Briefly, however, the disc pack enclosure 11 which may be constructed of a strong plastic material includes a lower cover section 17 and an upper cover section 19 which are releasably interconnected by locking means 21 which projects axially through the disc pack enclosure. The disc pack enclosure 11 has a handle 23 to facilitate transporting of the disc pack enclosure and a central portion 25 of the upper cover section 19 is transparent.

The disc pack 13 includes a plurality of memory discs 27 and a supporting structure 29. The memory discs are annular oxide coated metal members on which large quantaties of information can be stored.

The supporting structure 29 includes a plurality of spacers 31 which are provided intermediate adjacent memory discs 27 to space the discs from each other. The supporting structure 29 maintains the discs 27 in stacked, parallel, coaxial relationship and includes a hub 31 for mounting the disc pack 13 on a data processing unit (not shown) which drives the entire disc pack in roation when the disc pack enclosure 11 is removed. The supporting structure 29 also includes a clamp ring 35 and a cover bezel 37 mounted coaxially with the discs 27.

The cover bezel 37 includes an outer annular region 39 which rests on a cover disc 41. The cover bezel 37 also includes a peripheral wall 43 and a bottom wall 45 having a central aperture 47 extending therethrough. The peripheral wall 43 and the bottom wall 45 define an inwardly projecting axial well 49. An annular portion 51 of the bottom wall 45 surrounding the aperture 47 rests on the hub 31. The locking means 21 forms an axial column which projects through the aperture 47 into the well 49.

The card label 15 is adhered to the bottom wall 45 as shown in FIG. 2 in which position it is protected against contact which might cause fraying of the card label. The card label 15 has an outer periphery 53 and an inner periphery 55 which lie closely adjacent the peripheral wall 43 and the locking means 21, respectively. The outer periphery 53 of the card label 15 fits snugly within the peripheral wall 43 and this assures that the card label will be mounted axially with respect to the disc pack 13. This in turn assures that the card label will not unbalance the dynamically balanced disc pack 13.

The card label 15 should be constructed of a non-fraying material to avoid contamination of the discs 27. Examples of such materials are paper impregnated with rubber or plastic, Mylar, mat finish vinyl material, etc. The material used for the card label 15 should also be self supporting so that it can be easily adhered to the cover bezel within the well 49 thereof. This latter requirement makes materials such as Mactac somewhat unsuitable. Finally, the material should readily absorb ink or pencil marks to avoid smearing. This latter requirement renders otherwise suitable materials such as Mylar not preferred. A plastic or rubber impregnated paper meets all of the above noted requirements and is preferred.

Figures 3, 4, 5:
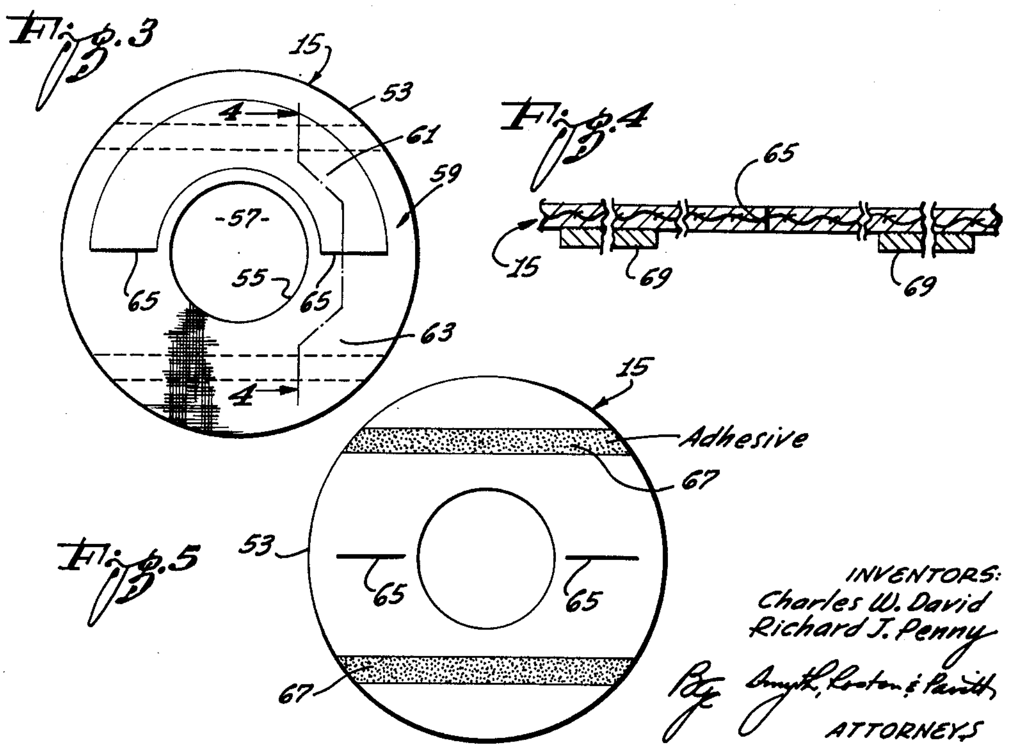
FIG. 3 is an enlarged top plan view of a card label.
FIG. 4 is an enlarged fragmentary sectional view taken along line 4—4 of FIG. 3.
FIG. 5 is a bottom view of the card label with the backing removed to expose the adhesive.

With reference to FIG. 3, it can be seen that the card label 15 is annular and that the peripheries 53 and 55 are circular and coaxial with the inner periphery 55 defining a circular opening 57 in the card label. The card label 15 has an upper face 59 having regions 61 and 63 of contrasting colors thereon. Preferably, both of the regions 61 and 63 are relatively large. All of the upper face 59 or any portion thereof may constitute a writing surface for receiving identifying marks to identify the disc pack 13.

The card label 15 is provided with a pair of radially extending diametrically opposed slits 65 each of which define an accessible interior edge of the card label. As shown, the slits 65 preferably do not intersect either of the peripheries 53 or 55. Other shapes and arrangements of slits or openings in the card label 15 may be used; however, it is important that the arrangement selected provide a convenient accessible interior edge of the card label and be sized to receive a finger of the user to facilitate removal of the card label 15 from the bottom wall 45 of the cover bezel 37.

FIG. 4 shows a section through the card label 15 prior to the time that the card label is initially installed on the disc pack 13. In this condition, the card label 15 has a low holding force pressure sensitive adhesive 67 in the form of two strips ⅜" wide, and running parallel to and 1½ inch from the slits 65. These strips extend continuously across the reverse side of the card label 15 and terminate at periphery 53. The adhesive 67 secures removable backing strips 69 to the card label 15. Of course, other arrangements of the adhesive can be used but it is desirable that the edges of the slits 65 be free of adhesive to facilitate insertion of a finger therein.

The backing strips 69 are preferably coextensive with the adhesive 67 and are removed from the card label in a conventional manner prior to applying the card label to the disc pack 13.

In using of the card label 15, the disc pack enclosure 11 is removed from the disc pack 13 and the upper face 59 of the card label 15 is written upon to provide the desired identifying marks. If necessary, following the writing operation the card label 15 may be suitably cleaned or dusted. Next, the removable backing strips 69 are peeled off of the card label 15 and the card label is adhesively secured to the bottom wall 45 of the cover bezel 37 as shown in FIG. 2. Because the periphery 53 of the card label 15 is sized to snugly fit within the generally annular periphery wall 43, the card label 15 is coaxial with the cover bezel 37 and the disc pack 13 and this prevents the card label 15 from dynamically unbalancing the disc pack. When the disc pack 13 is being rotated by the data processing unit (not shown), the regions 61 and 63 of different colors will immediately advise the operator upon visual inspection of the disc pack 13 that the pack is rotating.

When the information on the pack 13 is changed, it will be necessary or desirable to make a corresponding change in the identifying marks on the card label. As the card label 15 should not be written upon when it is secured to and is a part of the disc pack 13, it is necessary to remove it prior to changing the identifying marks. With the present invention, however, the operator can quickly and conveniently remove the card label 15 by inserting a finger or fingers into the slits 65. As there is no adhesive along the edge of the slits 65, the fingers of the operator can get beneath a portion of the card label 15 to peel the card label off of the bottom wall 43. This would be very difficult or impossible to accomplish without the slits 65 because the space between the peripheral wall 43 and the outer periphery 53 and the space between the inner periphery 55 and the locking means 21 are insufficient to conveniently allow removal of the card label 15. Furthermore, the curved peripheries 53 and 55 do not provide a convenient edge for removal of the card label 15. After the card label 15 is removed, the old identifying marks can be deleted as by writing over them and the new marks can be placed on the card label, following which the card label 15 is again adhered to the cover bezel 37 as shown in FIG. 2. Thus, multiple usage of the card label 15 can be obtained.

Although an exemplary embodiment of the invention has been shown and described, many changes, modifications and substitutions may be made by one having ordinary skill in the art without necessarily departing from the spirit and scope of this invention.

What is claimed is:

1. A disc pack rotatable by a data processing unit, comprising:

a plurality of memory discs;

a supporting structure for retaining the discs in spaced, stacked, generally coaxial relationship;

a cover bezel mounted adjacent the upper end of the disc pack generally coaxially with the memory discs, said cover bezel having a well projecting axially inwardly with the well having a bottom wall with an upper face and a peripheral wall;

a card label having upper and lower faces with the upper face having a writing surface thereon, said card label being constructed of a generally nonfraying material; and a pressure sensitive adhesive securing said lower face of said card label to said upper face of said bottom wall of said well whereby said card label rotates with the disc pack, said writing surface of said card label being visible from above the disc pack and the card label being mounted generally axially with respect to the disc pack whereby the presence of said card label will not unbalance the disc pack.

2. A disc pack as defined in claim 1 wherein the disc pack has an axial column portion in said well adjacent the bottom wall thereof and said card label is annular with the outer and inner peripheries thereof lying closely adjacent said peripheral wall and said axial column, respectively, to thereby assure that the card label cannot be mounted on the bottom wall in a manner that would unbalance the disc pack.

3. A disc pack as defined in claim 2 wherein said card label has a cut portion defining an accessible interior edge portion of the card label engageable by the finger of the user to facilitate removal of the card label from the cover bezel, said card label along at least a portion of said accessible interior edge portion being free of adhesive to facilitate insertion of the finger of the user through the cut portion and beneath the card label to remove the card label from the cover bezel and said upper face having at least two portions of different colors so that rotational movement of the disk pack is apparent upon visual inspection.

4. In combination:

a rotatable disc pack including a plurality of memory discs and a supporting structure for holding said memory discs in stacked generally coaxial relationship, said disc pack including means defining a generally centrally located surface adjacent the upper end of the disc pack;

a removable disc pack enclosure mountable on the disc pack for storing and transporting the latter, said disc pack enclosure having an upper wall with a centrally located transparent portion, said transparent portion and said disc pack surface being in at least partial registry when the disc pack enclosure is mounted on the disc pack, said transparent portion having an inner surface;

a card label having upper and lower faces with at least a portion of the upper face being capable of being written on, said card label being constructed of a generally nonfraying material; and an adhesive securing said card label to one of said surfaces with said portion of said upper face of the card label being visible through said transparent portion of said disc pack enclosure from above the disc pack enclosure.

5. A combination as defined in claim 4 wherein the card label is adhered to said surface of the disc pack, said upper face has at least two colors thereon so that rotational movement of the disc pack will be apparent upon visual inspection, and the card label is mounted axially with respect to the disc pack so that the card label will not unbalance the disc pack.

6. A disc pack as defined in claim 1 wherein said upper face of said card label includes at least two portions of different colors so that rotational movement of the disc pack is apparent upon visual inspection.

References Cited

UNITED STATES PATENTS

| | | | |
|---|---|---|---|
| 876,785 | 1/1908 | Ellis | 40—340 |
| 1,940,088 | 12/1933 | Harrison | 274—42 |
| 2,091,346 | 8/1937 | Wright | 40—2 |
| 3,176,281 | 3/1965 | Pattison | 340—174.1 |
| 3,230,649 | 1/1966 | Karn | 40—2 |
| 3,312,005 | 4/1967 | McElroy | 40—2 |

BERNARD KONICK, Primary Examiner

WILLIAM F. WHITE, Assistant Examiner

U.S. Cl. X.R.

40—2, 10; 161—109, 147, 167; 206—62; 283—18; 346—137